Jan. 7, 1930. M. B. ROBERTS 1,742,786
ARTIFICIAL BAIT
Filed Aug. 2, 1928
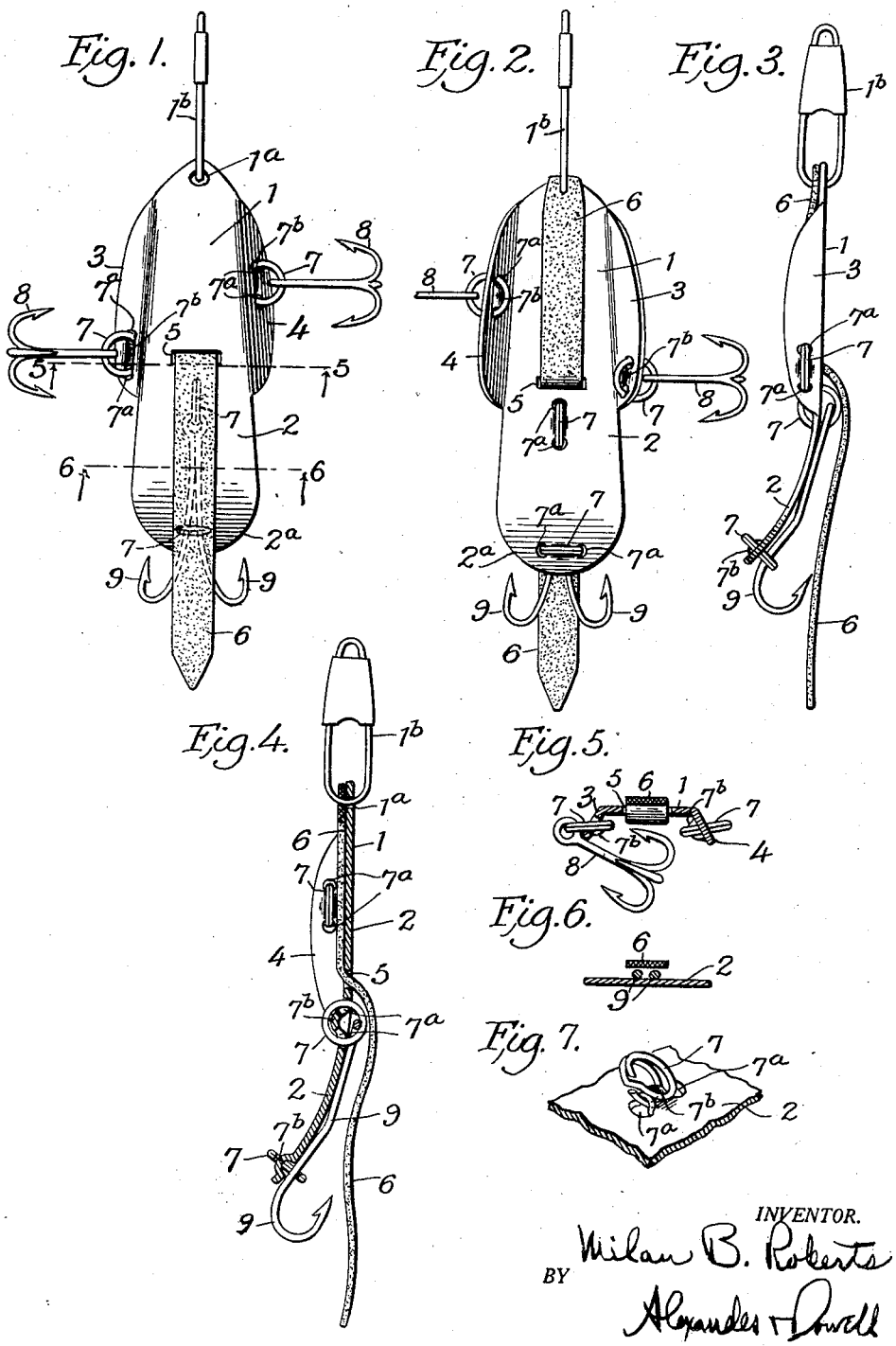

Patented Jan. 7, 1930

1,742,786

UNITED STATES PATENT OFFICE

MILAN B. ROBERTS, OF FLINT, MICHIGAN

ARTIFICIAL BAIT

Application filed August 2, 1928. Serial No. 297,058.

This invention is a novel improvement in artificial baits and the principal object of the invention is to provide an artificial bait containing certain novel features hereinafter set forth.

I will explain the invention with reference to the accompanying drawing which illustrates one practical embodiment thereof to enable others to adopt and use the same; and will summarize in the claims the novel features of construction, and novel combinations of parts, for which protection is desired.

In said drawing:

Fig. 1 is a top plan view of the complete artificial bait.

Fig. 2 is a bottom plan view thereof.

Fig. 3 is a side view thereof.

Fig. 4 is a section on the longitudinal axis thereof.

Fig. 5 is a transverse section on the line 5—5, Fig. 1.

Fig. 6 is a transverse section on the line 6—6 Fig. 1.

Fig. 7 is a view showing one of the split rings partially attached to the body of the bait.

As shown, my novel bait preferably comprises a sheet metal plate having a substantially flat head portion 1 provided with a perforation 1$^a$ for attachment of the usual ring 1$^b$ of the fishing line whereby the bait may be readily drawn through the water. The tail portion 2 of the body is bent on a slight arc, as plainly shown in Fig. 4, the rear end of tail portion 2 being rounded in plan as at 2$^a$ preferably to semi-circular form.

The portions 1 and 2 preferably form an elongated body the sides of which converge slightly towards the head end as shown in Figs. 1 and 2. The tail portion 2 while arcuate in longitudinal section is flat in transverse section as clearly shown in Fig. 6, giving the the tail portion 2 a "thumb-nail" construction.

Extending integrally from the side edges of the flat head portion 1 are opposed bent wing portions 3 and 4, which wings are bent or flanged as shown in Figs. 4 and 5 and adapted to direct the water passing along the underside of the bait body against the arcuate tail portion 2, said wings 3 and 4 extening the full length of head portion 1, and the ends of the wings being rounded as shown.

At the approximate center of the body of the bait is a rectangular slot 5 through which extends a pork rind strip 6 the forward end of which is secured to the ring 1$^b$ of the fishing line and extends rearwardly along the underside of the body between the bosom of the bent wings 3 and 4 then upwardly through slot 5, and then continues rearwardly along the axis of the bait on the upper side of the body, the rind 6 trailing the bait as shown.

In wing 3 adjacent its rear end is mounted a split ring 7 passing through two adjacent perforations 7$^a$ in the body of the wing, the metal of the wing between the perforations 7$^a$ being swaged or bent inwardly, as at 7$^b$, on an arc conforming substantially with the curvature of the ring 7 whereby, as shown in Fig. 7, the split ring 7 may be readily secured directly to the body of the wing. Where the metal between the perforations is not thus swaged or bent I have found it practically impossible to attach the split rings to the body without injury to the rings 7, unless the holes 7$^a$ are made so large in diameter and so near together as to be useless for relatively fixing the rings in the body.

Moreover the swaged portions 7$^b$ bear normally against the inner periphery of the rings 7 as shown in Fig. 4 tending to maintain the rings disposed diametrically of the body. To the split ring 7 on the outer side of wing 3 is attached a ganghook 8.

Similarly a ring 7 is secured into the body of the wing 4 adjacent its outer end and carries a ganghook 8.

In the body of the bait, on the axis thereof, immediately in rear of the slot 5 is a ring 7 similarly secured as the rings 7 of the wings 3 and 4; and at the rear end of tail portion 2 transversely to the axis of the bait is also a ring 7 secured similarly to the rings 7 of wings 3 and 4. Extending through the ring 7 at the rear end of the bait is a bifurcated hook 9 having its inner end looped through the ring 7 adjacent slot 5, the rear or outer ends of the hook 9 being flared outwardly and straddling the rind 6, and the hook 9 being thus relatively fixed in axial position on the outer rear portion of the bait by the rings.

In operation, as the bait is pulled through the water, the water passes between the bent wings 3 and 4 of the head portion 1 and is directed by said wings against the thumbnail shaped tail portion 2 thus setting up an extremely violent and erratic wobbling and twisting motion, and during its erratic whipping and slashing through the water the highly polished or otherwise finished surfaces of the bait body are exposed to the daylight or sunlight in such a manner as to direct the resultant light rays back, down, and sideways among the usual weeds on the river or lake bed, which weeds are the usual hiding place for game fish.

The bent wings 3 and 4 and tail portion 2 impart to the bait a sufficiently strong action in the water so that the bait will readily carry the three sets of hooks as efficiently as a wooden bait, and in such manner that the hooks will function properly, a result not possible to accomplish with the usual spoon or reflecting-blade type of bait, and I attribute this result primarily to the bent wing construction. As the bait is substantially flat and the three sets of gang hooks all disposed substantially together, the bait is practically one-hundred per cent efficient.

The semi-rigid mounting of the tail hook 9 is an improvement in hooking efficiency since a fish cannot knock the tail hook 9 out of the way, and the hook points are always presented in effective positions.

In my bait the hooks 8 do not tangle when in use and the tail hook 9 can be used on top or it can be reversed and slung under the bait with the same split ring equipment. This can be accomplished by using an ordinary jack-knife or similar tool with ease and at will. The advantage in so doing lies in the fact that reversing the position of the tail hook alters the degree of liveliness and the depth at which the bait works to suit the water conditions prevailing at the time the bait is being used. All hooks 8 and 9 are easily replaceable in case of breakage.

In States where the use of more than one hook point is forbidden the gang hooks 8 may be replaced by single hooks, and the bait will be effective with such single hooks though not to the same degree of hooking efficiency possible with gang hooks.

My claim to originality in mounting the hooks 8 and 9 does not lie in the mere use of the split rings 7 for the use of split rings is broadly old. My claim centers on the manner employed in attaching the split rings to the bait body. In the usual baits using split rings the rings have always been mounted through a single perforation located close to the edge of the bait, which method of mounting is very undesirable because the hooks are permitted to swing at will in any direction which the various forces encountered in fishing may impel. The hooks thus attached will tangle in a bunch rendering the hook points ineffective particularly in the method of fishing known as casting. The hooks will moreover fold back and lie on the underside of the bait quite out of reach of an approaching fish, and the hooks will flop and become tangled with the fishing line and it is even possible for a fish to knock the hooks completely out of the way with the force of his strike and thus miss the bait altogether.

In my bait however, the split rings are not merely passed through one single perforation close to the edge of the bait. My split rings are inset through the body by means of two round holes and a bulged depression in the metal of the bait body—the whole being "semi slot-like" in appearance. By so attaching the rings the swinging and flopping of the hooks 8 is confined to very narrow, definite, and restricted limits, thereby preventing in large measure the hooks tangling with each other, the hooks tangling with the line, and the hooks folding back and under the bait out of reach of the fish. Thus my hooks 8 are always exposed in an effective manner.

The hooking efficiency of my bait is further increased by the employment of gang-hooks, and it is possible to hook a fish whether he gets the bait in his mouth or not, as in practice the fish have often been hooked in the body rather than in the mouth. If a fish in lunging at the bait comes into the range of the bait's twist the action of the bait is violent enough to mechanically and automatically throw the hooks into the body of the fish. In this respect the bait is particularly effective against black bass and the larger pike because at certain times during the year these fish are inclined to fight a bait instead of biting it. At such times they attempt to knock baits out of the way by means of a ferocious body bunt or a vicious tail slap.

With my bait, the pork rind 6 gives contrast against the body color of the bait, and also makes the bait appear larger in the water than it really is, in order to induce the fish to go for the bait with mouth wide open instead of with just a bunt strike; and further pork rind 6 helps the bait flop its tail. In my bait the pork rind 6 is attached to the underside of the bait, the same being introduced through slot 5 in the bait body from under the bait—and allowed to dangle at will along the rear upper end without being impaled on the hooks 9.

Without the use of spinners,—special attachments,—accouterments, or impediments of any kind such as commonly used, I have succeeded in overcoming difficulties in making a sheet metal bait function properly in the water when the bait is loaded down with pork-rind or similar material or even when small blades of grass or sea weed accidentally become attached thereto; and I have succeeded in making the bait itself carry the pork rind without losing any of its operating efficiency, the pork rind acting in the capacity of a ballast thereby giving my bait an entirely different action in the water than that possessed by other baits of this type.

I do not limit my invention to the exact form shown in the drawing for obviously changes may be made therein within the scope of the claims.

I claim:—

1. A sheet metal bait, comprising a body having a flat head portion and an arcuate tail portion; symmetrically disposed flanged wings at the sides of the flat head portion adapted to direct the water against the arcuate tail portion; hooks secured to said wings; and a bifurcated hook disposed axially of the arcuate tail portion.

2. In a bait as set forth in claim 1, a slot in said body adjacent the center thereof; and a pork rind passed through said slot and extending forwardly on the underside of the bait, and extending rearwardly beyond the bait on the upper side thereof.

3. In a bait as set forth in claim 1, said hooks being secured to the bait by split rings passing through spaced perforations in the body, the metal between said perforations being bulged arcuately out of the plane of the body to suit the curvature of said rings.

4. An artificial bait comprising a sheet metal body having a flat head portion and an arcuate tail portion; the side edges of the body converging slightly towards the front end, and the rear end of the bait being rounded in plan; symmetrically disposed flanged wings at the sides of the flat head portion adapted to direct the water against the arcuate tail portion; hooks secured to the wings, and a bifurcated hook disposed axially of the arcuate tail portion.

5. In an artificial bait as set forth in claim 4, a slot in said body adjacent the center thereof; and a pork rind passed through said slot and extending forwardly on the underside of the bait and extending rearwardly beyond the bait on the upper side thereof.

6. In an artificial bait as set forth in claim 4, said hooks being secured to the bait by split rings passing through spaced perforations in the body, the metal between said perforations being bulged arcuately out of the plane of the body to suit the curvature of said rings.

7. An artificial bait comprising a sheet metal body having a flat head portion and an arcuate tail portion; the side edges of the body converging slightly towards the front end, and the rear end of the bait being rounded in plan; symmetrically disposed rings at the sides of the flat head portion making acute angles with the plane of the head portion and adapted to direct the water against the arcuate tail portion, a hook secured to each wing; and a relatively fixed bifurcated hook disposed axially of the arcuate tail portion.

8. In an artificial bait as set forth in claim 7, a slot in said body adjacent the center thereof; and a pork rind passed through said slot and extending forwardly on the underside of the body and extending rearwardly freely beyond the tail portion of the body on the upper side thereof.

9. In an artificial bait as set forth in claim 7, each of said hooks being secured to the bait by a split ring passing through spaced perforations in the body, the metal between said perforations being bulged arcuately out of the plane of the body to suit the curvature of said ring.

10. An artificial bait, comprising a sheet metal body having a flat head and an arcuate tail portion; a bifurcated hook disposed axially of the tail portion; a slot in the body adjacent the center thereof, and a pork rind passing through said slot and extending forwardly along the underside of the bait and extending rearwardly beyond the end of the bait on the upper side thereof.

11. In an artificial bait as set forth in claim 10, said hook being secured to the bait by a split ring passing through spaced perforations in the body, the metal between said perforations being bulged arcuately out of the plane of the body to suit the curvature of said ring.

12. In an artificial bait as set forth in claim 10, flanged wings at the sides of the flat head portion adapted to direct the water passing along the under side of the bait against the arcuate tail portion.

13. An artificial bait, comprising a sheet metal body having a flat head and an arcuate tail portion; a relatively fixed hook disposed axially of the tail portion; a slot in the body adjacent the center thereof, and a pork rind passing through said slot and extending forwardly along the under side of the bait and extending rearwardly beyond the end of the bait on the upper side thereof.

14. In an artificial bait as set forth in claim 13, flanged wings at the sides of the flat head portion adapted to pinch the water passing along the under side of the bait and to direct same against the arcuate tail portion; and hooks secured to the said wings.

15. In an artificial bait as set forth in claim 13, flanged wings at the sides of the flat head portion adapted to pinch the water passing along the under side of the bait and to direct same against the arcuate tail portion; and hooks secured to the said wings, each of said hooks being secured to the bait by split rings passing through spaced perforations in the body, the metal between said perforations being bulged arcuately out of the plane of the body to suit the curvature of said rings.

16. In an artificial bait, a sheet metal body and hooks secured to said body by split rings passing through spaced perforations in the body, the metal between said perforations being bulged arcuately out of the plane of the body to suit the curvature of said rings.

17. An artificial bait comprising a sheet metal body having a flat head portion and an arcuate tail portion, the side edges of the bait converging slightly towards the front end, symmetrically disposed flanged wings at the sides of the flat head portion adapted to direct the water against the tail portion; and hooks secured to the wings.

18. In an artificial bait as set forth in claim 17, a slot in said body adjacent the center thereof; and a pork rind extending through said slot and secured to the front end of the bait at the underside, said rind extending rearwardly of the slot freely beyond the tail portion of the bait on the upper side thereof.

19. In an artificial bait as set forth in claim 17, said hooks being secured to the bait by split rings passing through spaced perforations in the wings the metal between said perforations being bulged arcuately out of the planes of the wings to suit the curvature of said rings.

20. In an artificial bait having a sheet metal body, a slot in said body adjacent the center thereof; and a pork rind extending through said slot and secured to the front end of the body at the under side, said rind extending rearwardly freely beyond the tail portion of the bait on the upper side thereof; and hooks carried by said body.

MILAN B. ROBERTS.